United States Patent
He et al.

(10) Patent No.: US 12,172,387 B2
(45) Date of Patent: *Dec. 24, 2024

(54) FUSION WELDING DEVICE

(71) Applicant: TAIZHOU YONGPAI PACK EQUIPMENT CO., LTD., Taizhou (CN)

(72) Inventors: Yuhua He, Taizhou (CN); Shuibo Jiang, Taizhou (CN)

(73) Assignee: TAIZHOU YONGPAI PACK EQUIPMENT CO., LTD., Taizhou (CN)

( * ) Notice: Subject to any disclaimer, the term of this patent is extended or adjusted under 35 U.S.C. 154(b) by 181 days.

This patent is subject to a terminal disclaimer.

(21) Appl. No.: 17/917,087

(22) PCT Filed: Feb. 19, 2021

(86) PCT No.: PCT/CN2021/076824
§ 371 (c)(1),
(2) Date: Oct. 5, 2022

(87) PCT Pub. No.: WO2021/203846
PCT Pub. Date: Oct. 14, 2021

(65) Prior Publication Data
US 2023/0143919 A1    May 11, 2023

(30) Foreign Application Priority Data

Apr. 9, 2020  (CN) .......................... 202010273320.X
Apr. 9, 2020  (CN) .......................... 202020513565.0
(Continued)

(51) Int. Cl.
B29C 65/00    (2006.01)
B29C 65/06    (2006.01)
(Continued)

(52) U.S. Cl.
CPC ............ *B29C 66/855* (2013.01); *B29C 65/06* (2013.01); *B29C 66/8227* (2013.01);
(Continued)

(58) Field of Classification Search
CPC ... B29C 66/855; B29C 65/06; B29C 66/1122; B29C 66/4322; B29C 66/4324;
(Continued)

(56) References Cited

U.S. PATENT DOCUMENTS 9,174,752 B2 * 11/2015 Neeser .................. B65B 13/187

FOREIGN PATENT DOCUMENTS

CN              210063463 U   *   2/2020

* cited by examiner

Primary Examiner — Carson Gross
(74) Attorney, Agent, or Firm — MUNCY, GEISSLER, OLDS & LOWE, P.C.

(57) ABSTRACT

A fusion welding device, comprising a fusion welding work motor, a fusion welding work moving assembly, and a fusion welding work fixed assembly, the fusion welding work motor being connected to the fusion welding work moving assembly by means of a transmission mechanism. The fusion welding device is provided with a central connection component that is able to rotate, and the central connection component is provided with a first input position, a second input position, and a locking structure connection position. The present fusion welding device is able to implement automatic band pressing and fusion welding work by means of relatively simple structural cooperation, and by means of differently transmitted front and back connections and changes in engagement, and is able to automatically lift the fusion welding work moving assembly without requiring a handle or related operations.

19 Claims, 7 Drawing Sheets

(30) Foreign Application Priority Data

Apr. 9, 2020 (CN) .......................... 202020514072.9
Feb. 3, 2021 (CN) .......................... 202120322629.3

(51) Int. Cl.
 *B65B 13/18* (2006.01)
 *B65B 13/32* (2006.01)
(52) U.S. Cl.
 CPC ........ *B29C 66/8244* (2013.01); *B65B 13/185* (2013.01); *B65B 13/187* (2013.01); *B65B 13/32* (2013.01); *B65B 13/322* (2013.01)
(58) Field of Classification Search
 CPC ..... B65B 13/18; B65B 13/185; B65B 13/187; B65B 13/24; B65B 13/32–327
 See application file for complete search history.

FUSION WELDING DEVICE

FIELD OF THE INVENTION

The present invention relates to a fusion welding device, in particular to a fusion welding device of a packing belt of a hand-held baler.

BACKGROUND OF THE INVENTION

There is a way of bonding the belts, for example, using PET or PP strapping tape to bundle products or packages in a handheld electric baler, and then tightening and bonding the tape, which is to bond the two parts that need to be bonded through the way of frictional heating. For a hand-held baler, it is always intended to complete a serried of actions through the automatic operation of the machine with few operations, and the structure of the machine is preferably as simple as possible, rationally arranged, light and beautiful.

SUMMARY OF THE INVENTION

The technical problem to be solved by the present invention is to provide a fusion welding device, which can be applied to a hand-held baler to weld the baling belt, and is simple in operation and structure. In order to achieve the object, the present invention adopts the following technical solutions:

A fusion welding device, comprising a fusion welding work motor, a fusion welding work moving assembly, and a fusion welding work fixed assembly, the fusion welding work motor being connected with the fusion welding work moving assembly by means of a transmission mechanism; the fusion welding device is provided with a central connection component that is able to rotate, and the central connection component is provided with a first input position, a second input position, and a locking structure connection position;

The first input position is transmissively connected to a clutch of the fusion welding work motor, and the fusion welding work motor is able to drive, by means of the first output component, the first input position to produce a rotation in a second direction, and thereby drive the central connection component to rotate in the second direction, and after rotating to a set angle, the two disengage, said set angle corresponding to the angle of rotation required for the fusion welding work moving assembly to move to a fusion welding working location.

The second input position, on the basis of driving of the motor, produces the rotation in the first direction, to cause central connection component to produce rotation in the first direction and cause the first input position to be connected to the first output component.

Further, the first input position is a sector gear, the first output component is a gear; the second input position is a gear, and on the basis of the driving of the fusion welding work motor, produces a rotation in the first direction.

Further, the fusion welding device is provided with a fusion welding working state locking structure of a fusion welding work moving assembly, the locking structure is arranged obliquely, and the upper end thereof is rotatably connected to the locking structure connection position, the axis of rotation is parallel to the axis of rotation of the central connection component, and the lower end thereof is connected with the fusion welding work moving assembly; the fusion welding device is provided with a limiting structure to limit the maximum rotation angle of the central connection component in the second direction; the fusion welding device is configured such that the locking structure is in a locked state when the fusion welding work is performed, and the first input position 和 first output component are in a disengaged state, and the central connection component maintains a tendency to rotate in a second rotational direction, so that the fusion welding work moving assembly is not lifted up, before the fusion welding work starts, the fusion welding work moving assembly is in a lifted state, the locking structure is in a non-locked state, and the first input position and the first output component are in a connected state.

Further, the fusion welding working state locking structure comprises an upper assembly and a lower assembly, the upper assembly is rotatably connected with the locking structure connection position, and the lower assembly is rotatably connected with the fusion welding work moving assembly; a compression spring is provided between the upper assembly and the lower assembly, and a length adjusting component is provided for one of the upper assembly and the lower assembly, and an inserting connection component mated with the length adjusting component is provided for the other; the fusion welding device is provided with a limiting structure to limit the maximum rotation angle of the central connection component rotating to the second direction; The locking structure, the fusion welding work moving assembly, and the central connection component are configured such that when the fusion welding work is performing, the locking structure is in a locked state, and the first input position and the first output component are in a disengaged state, and the central connection component remains the tendency to rotate in the second rotation direction, the axis of rotation for the rotational connection between the locking structure and the locking structure connection position is outside the first side of the plane; before the fusion welding work starts, the fusion welding work moving assembly is in a lifted state, the locking structure is in a non-locked state, the axis of rotation for the rotational connection between the locking structure and the locking structure connection position is outside the second side of the plane, and the first input position and the first output component are in a connected state; the plane is the plane that passes through the axis of rotation of the central connection component and the axis of rotation for the rotational connection between the fusion welding work moving assembly and the locking structure.

Further, the fusion welding work moving assembly comprises a mounting frame, the mounting frame is rotatably mounted on the mounting base, and the mounting frame is further connected with the central connection component by means of the fusion welding working state locking structure, the rotation of the central connection component in the second direction causes the fusion welding work moving assembly to rotate to an angle for the fusion welding work by means of the locking structure, and is locked without reverse rotation.

Further, the fusion welding work moving assembly comprises a fusion welding working component and a fusion welding working power input connection component, and the fusion welding working component and the fusion welding working power input connection component are hinged, the fusion welding working power input connection component is connected with one end of the transmission mechanism by means of an eccentric structure, and the other end of the transmission mechanism is connected with an output end of the fusion welding work motor; the fusion welding working component is slidably connected to a guide rail on the mounting frame; the hinge axis of the fusion welding working component and the fusion welding working power input connection component is parallel to the axis of rotation of the mounting frame.

Further, the fusion welding work moving assembly comprises a mounting frame top spring arranged between the mounting frame and the mounting base.

Further, the fusion welding work motor and the transmission mechanism are in a one-way transmission connection relationship, when the central connection component moves in the first direction, the fusion welding work motor and the transmission mechanism are in a drive disengagement connection, and the fusion welding work motor does not drive the transmission mechanism.

Further, the fusion welding work motor and the second input position are in a one-way transmission connection relationship, and when the central connection component moves in the second direction, the fusion welding work motor and the second input position are in a drive disengagement connection, and the fusion welding work motor does not drive the second input position, and the central connection component is driven to rotate by the motor driving force received by the first input position; the fusion welding work motor is configured to automatically rotate in the reverse direction after the fusion welding work is completed, and the central connection component generates a reset rotation in the first direction by means of the connection with the second input position.

Further, the second input position is a gear, and the fusion welding work motor can drive the second input position to rotate in the first direction by means of the second output component; the first output component, the second output component and a driving wheel of the transmission mechanism are all mounted on the output shaft of the fusion welding work motor, and the second output component and the driving wheel of the transmission mechanism are connected with the output shaft in a one-way drive in the opposite direction, when the fusion welding work motor is rotating forward, the driving wheel of the transmission mechanism can be driven, and when the fusion welding work motor is rotating reversely, the second output component can be driven to rotate.

Further, the front end of the sector gear of the first input position is provided with elastic tooth component that mate with the first output component in the first direction.

Further, the elastic tooth component adopts an elastic sheet and is connected to the front side of the sector gear in the first direction by means of a connection structure.

The first output component adopts a gear, the first input position is a sector gear; the first output component is provided with a shaft hole, and the motor output shaft penetrates the shaft hole, a torsion spring is provided between the motor output shaft and the first output component; there is a spacing in the circumferential direction between the motor output shaft and the first output component, the motor output shaft is provided with a first driving position to drive the sector gear of the first input position to rotate in the second direction, the motor output shaft is provided with a second driving position, and drives the sector gear of the first input position to rotate in a first direction after the sector gear is turned from being disconnected from the motor output gear to a connected state;

The working direction of the torsion spring is that after the sector gear of the first input position rotates at a certain angle and is disengaged from the motor output gear, the first output component is driven to continue to rotate when the motor output shaft stops rotating, to cause the first output component to disengage the connection with the first driving position.

A torsion spring connection hole is provided on the end face of the first output component, the torsion spring is sleeved on the shaft, and one end of the torsion spring is connected with the torsion spring connection hole.

The part where the motor drive shaft is connected with the first output component is a flat shaft, the motor shaft hole of the first output component is provided with a protrusion, and the two sides of the protrusion are respectively mated with the first driving position and the second driving position of the motor output shaft.

The torsion spring drives the first output component to continue rotation when the motor output shaft stops rotating after the sector gear of the first input position rotates by a certain angle, such that the first output component disengages the connection with the first driving position and rotates to contact with the second driving position.

The central angle corresponding to the spacing is smaller than the angle between adjacent teeth of the sector gear of the first input position.

The end face of the first output component is provided with a torsion spring connecting hole, the torsion spring is sleeved on the flat shaft, one end of the torsion spring is connected with the torsion spring connecting hole, and the torsion spring is provided with a flat spring coil matching the shape of the flat shaft, and is connected with the flat shaft.

The fusion welding device is a packing belt fusion welding device of a hand-held baler, and the hand-held baler does not have a reset handle for the fusion welding device and the tensioning device, and the reset means the state in which a fusion welding work moving assembly can be opened to place a packing belt between the fusion welding work moving assembly and the fusion welding work fixed assembly after the central connection component rotates in the first direction.

Due to the adoption of the technical solutions of the present invention, the present fusion welding device is able to implement automatic band pressing and fusion welding work by means of relatively simple structural cooperation, and by means of differently transmitted front and back connections and changes in engagement, and is able to automatically lift the fusion welding work moving assembly without requiring a handle or related operations.

DETIALED DESCRIPTION

Referring to the figures, a fusion welding device of the present invention comprises a fusion welding work motor 200, a fusion welding work moving assembly, and a fusion welding work fixed assembly; the fusion welding work motor is connected with the fusion welding work moving assembly by means of a transmission mechanism; the fusion welding device is provided with a central connection component 1 which is rotatably connected to a fixed mounting base 100, and the reference numeral 10 is a rotating shaft of the central connection component. The central connection component is provided with a first input position 11, a second input position 12, and a locking structure connection position 13. The mounting base 100 is mounted on a base 300 of a hand-held baler.

The first input position 11 adopts a sector gear and is transmissively connected to a clutch of the output component 201 of the fusion welding work motor 200. The first output component 201 adopts a gear and is mounted on the motor output shaft 205. The fusion welding work motor 200 can drive the first input position 11 to produce a rotation in a second direction (embodied as rotation in the counter-clockwise direction of the first input position 11 in FIG. 5) by means of the first output component 201, and thereby drive the central connection component 1 to rotate in the second direction as a whole, and after rotating to a set angle, the two disengage, said set angle corresponding to the angle of rotation required for the fusion welding work moving assembly to move to a fusion welding working location (that is, moving from the angle of FIG. 5 to the angle of FIG. 6). Due to the adoption of the sector gear, the clutch timing and rotation angle are controlled by determining the sector angle of the gear, the structure is simple, and the clutch operation is reliable and stable.

The second input position 12, on the basis of driving of the fusion welding work motor 200, produces the rotation in the first direction, to cause central connection component 1 to produce rotation in the first direction and cause the first input position 11 to be connected to the first output component 201.

The fusion welding device is provided with a fusion welding working state locking structure of the fusion welding work moving assembly, the locking structure is arranged obliquely, the upper end of the locking structure and the locking structure connection position 13 are hinged by means of the shaft 21, the shaft 21 is parallel to the shaft 10, the lower end of the locking structure is rotatably connected to the fusion welding work moving assembly; the fusion welding device is provided with a limiting structure to limit the maximum rotation angle of the central connection component 1 in the second direction when the fusion welding work is performed. At the maximum rotation angle, the sector gear and the output component have been disengaged, the limiting structure is composed of the gear 101 on the frame of the hand-held baler and the stop block 14 on the central connection component 1.

The preferred structure of the above locking structure is that the locking structure is composed of an upper assembly and a lower assembly, the upper assembly is provided with a first connection component 24, and the connection component 24 and pressing and locking output connection component 13 for the fusion welding work are hinged by means of a shaft 21; the second connection component 25 is provided on the lower assembly, and the second connection component 25 is rotatably connected with the fusion welding work moving assembly. A compression spring 22 is provided between the upper assembly and the lower assembly. The first connection component in the upper assembly is provided with a nut 26 and is connected with the length adjusting component 23 by threaded connection, and the length adjusting component 23 is inserted into the second connection component 25. The locking structure, the fusion welding work moving assembly, and the central connection component 1 are configured such that when the fusion welding work is performing (FIG. 6), the locking structure is in a locked state, and the first input position 11 and the output component 201 are in a disengaged state, the central connection component 1 maintains a tendency to rotate in the second rotational direction, and the axis of rotation for the rotational connection between the locking structure and the locking structure connection position 13 is outside the first side of the plane; before the fusion welding work starts (FIG. 5), the fusion welding work moving assembly is in a lifted state, the locking structure is in a non-locked state, the axis of rotation for the rotational connection between the locking structure and the locking structure connection position is outside the second side of the plane, and the first input position 11 and the first output component 201 are in a connected state; the plane is the plane that passes through the axis of rotation of the central connection component and the axis of rotation for the rotational connection between the fusion welding work moving assembly and the locking structure, and the first side and the second side are divided into the front and back sides of the plane.

The fusion welding work moving assembly comprises a mounting frame 31, the mounting frame 31 is rotatably mounted on the mounting base 100 by means of a bearing 32, and the mounting frame 31 is also connected with the central connection component by means of the fusion welding working state locking structure; specifically, the mounting frame 31 is rotatably connected with the second connection component 25 by means of the pin shaft 27. In this way, the rotation of the central connection component 1 in the second direction causes the fusion welding work moving assembly to rotate to the angle for the fusion welding work by means of the locking structure and is locked without reverse rotation.

The fusion welding work moving assembly comprises a top spring 37 for the arrangement of the mounting frame between the mounting frame 31 and the mounting base 100.

The fusion welding work moving assembly comprises a fusion welding working component 33 and a fusion welding working power input connection component 34, the fusion welding working component 33 and the connection component 34 are hinged, and the fusion welding working power input connection component 34 is connected with one end of the transmission mechanism 202 by means of an eccentric shaft 35; the transmission mechanism 202 can be a belt transmission mechanism, the eccentric shaft 35 is connected with the driven wheel 203 of the transmission mechanism, and the driving wheel 204 of the transmission mechanism is connected with the output shaft 205 of the fusion welding work motor; the fusion welding working component 33 is slidably connected to the guide rail 36 on the mounting frame 31, and a snap-fit ball can be provided in the arc groove between their sides, and the fusion welding working component 33 is slidably connected to the guide rail 36; the hinge axes of the fusion welding working component 33 and the fusion welding working power input connection component 34 are parallel to the axis of rotation of the mounting frame 31 and are also parallel to the eccentric shaft 35.

The fusion welding work motor 200 and the transmission mechanism 202 are in a one-way transmission connection relationship, when the central connection component 1 is driven by the fusion welding work motor 200 to move in the first direction, the fusion welding work motor 200 and the transmission mechanism 202 are in a drive disengagement connection, and the fusion welding work motor 200 does not drive the transmission mechanism 202. This can be connected by means of a one-way bearing in the corresponding direction between the driving wheel 204 and the output shaft 205 of the fusion welding work motor.

The fusion welding work motor 200 and the second input position 12 are in a one-way transmission connection relationship, but opposite to the direction of one-way transmission connection relationship between the fusion welding work motor 200 and the transmission mechanism 202, when the central connection component is driven by the fusion welding work motor 200 by means of the input connection of the first input position 11 and moves in the second direction, the fusion welding work motor and the second input position are in a drive disengagement connection, and the central connection component is driven to rotate by the motor driving force received by the first input position.

The fusion welding work motor 200 is configured to automatically rotate in a reverse direction after the fusion welding work is completed, which can obtain the signal of automatic reverse rotation through the setting of the fusion welding work time, and cause the central connection component 1 to produce a reset rotation in the first direction by means of the connection with the second input position 12. When the hand-held baler is started, once the power is turned on, the fusion welding work motor 200 also works in the reverse direction to reset the device.

The second input position 12 also adopts a sector gear with a certain sector angle. The fusion welding work motor 200 can drive the second input position 12 to rotate in the first direction by means of the second output component 206. The second output component 206 also adopts a gear. For the one-way drive of the second output component 206, it can also be connected with the output shaft 205 of the fusion welding work motor through a one-way bearing 207 in a corresponding direction.

Therefore, in the present invention, the first output component 201, the second output component 206 and the driving wheel 204 of the transmission mechanism are all mounted on the output shaft of the fusion welding work motor, thereby simplifying the automatic control that can obtain a non-reset handle operation based on the solutions of the present invention and greatly simplifying the structure. The reset means that when the central connection component rotates in the first direction, the fusion welding work moving assembly can be opened to place a packing belt between the fusion welding work moving assembly and the fusion welding work fixed assembly; after the central connection component rotates in the first direction, the opening can be carried out automatically by means of the return spring 37.

The front end of the sector gear of the first input position 11 is provided with elastic tooth component that mate with the first output component 201 in the first direction, so that it can have extensive adaptability when the central connection component 1 is reset and rotated in the first direction, ensuring the automatic connection of the overall work of the hand-held baler is carried out. The elastic tooth component adopts a metal elastic sheet 5 and is connected to the front side 15 of the sector gear in the first direction by means of a connection structure. The first tooth 16 at the front end of the sector gear body in the first direction is a half tooth with a notch 17 on the front side. The elastic sheet 5 is located in front of the notch 17, and the notch 17 is used to form the volley of the elastic sheet to exert the elasticity.

The fusion welding work fixed assembly is a stationary structure at the bottom of the hand-held baler, and a fixed friction structure 4 is arranged on the upper surface. The fusion welding working component 33 is mated with the fixed friction structure 4, and causes the joints of the packing belt to be heated and welded by friction.

When working, in the state of fusion welding work, the fusion welding work motor 200 rotates forward for a certain period of time according to the set time, and the packing belt joints are welded. After the time is over, in the absence of manual intervention, the fusion welding work motor 200 obtains a signal of reverse rotation according to the set time interval.

When the fusion welding work motor 200 starts to rotate reversely, the entire central connection component 1 rotates in the first direction (clockwise direction in FIG. 6) with the mating of the second output component 206 and the second input position. Thus, the first input position 11 is turned from the disengaged state with the first output component to the engagement between the two, and continues to rotate to the position shown in FIG. 5, however, since the fusion welding work motor 200 and the transmission mechanism 202 are in a one-way transmission connection relationship, the transmission mechanism does not rotate reversely. After the locking structure connection position 13 rotates in the first direction, the axis of rotation between the inclined locking structure and the locking structure connection position 13 also turns to the outside of the second side of the aforementioned plane, the locking structure is thereby unlocked, and the mounting frame 31 can be rotated and lifted to reset, and the bonded packing belt can be removed, and at the same time, the packing belt that needs to be packed and welded is placed (FIG. 5).

Figure 1:
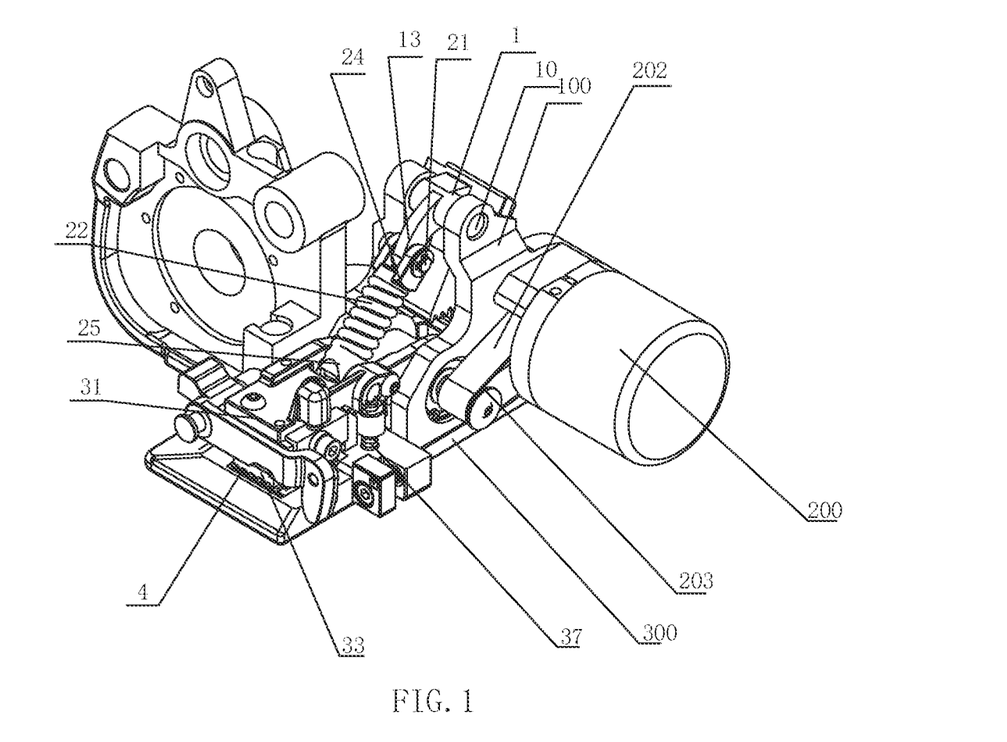
FIG. 1 is a structural schematic diagram according to an embodiment of a hand-held baler of the present invention.
Figure 2:
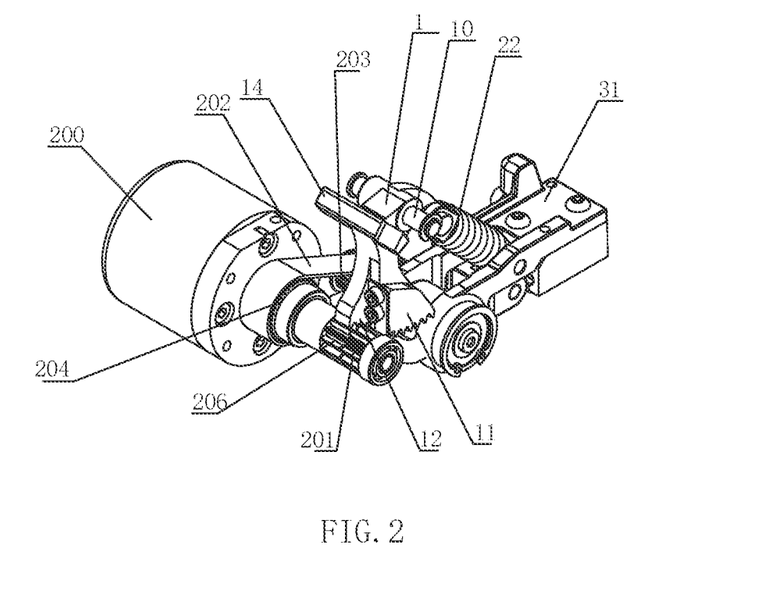
FIG. 2 is a schematic diagram of the main structure of a fusion welding device when the fusion welding work is performing according to an embodiment of a hand-held baler of the present invention.
Figure 3:
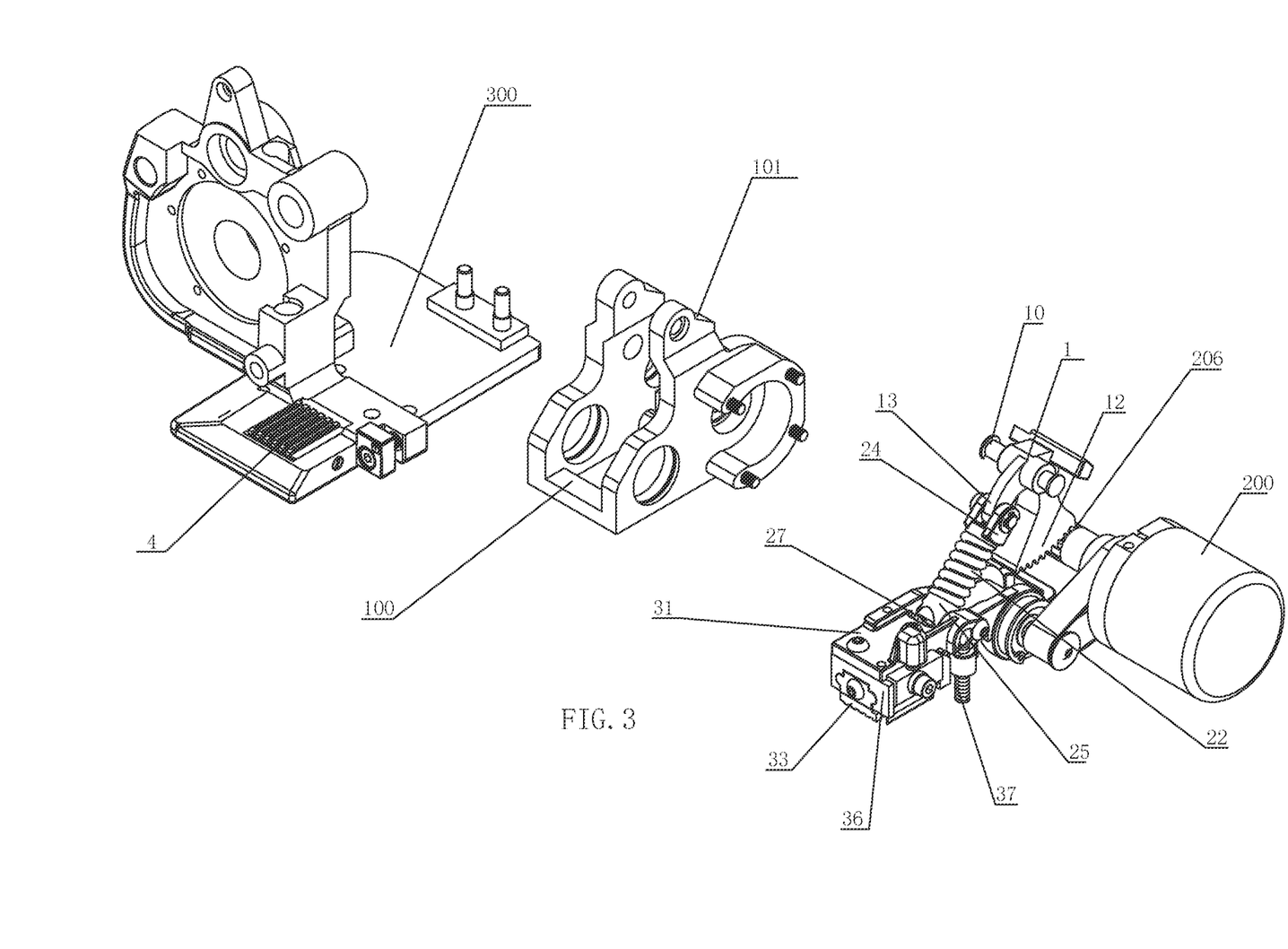
FIG. 3 is an exploded view of a structure according to an embodiment of a hand-held baler of the present invention.
Figure 4:
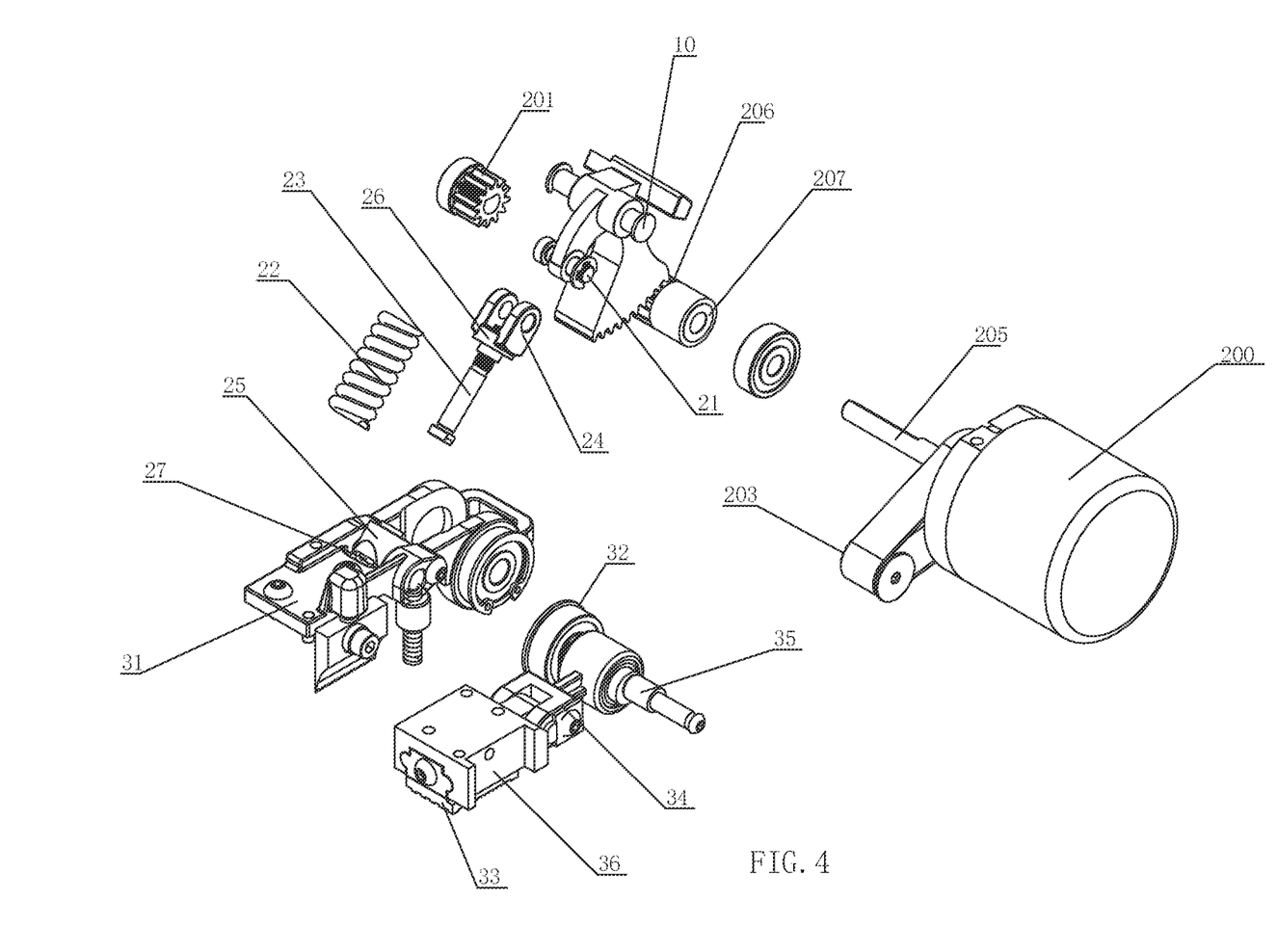
FIG. 4 is an exploded view of a structure shown in FIG. 2.
Figure 5:
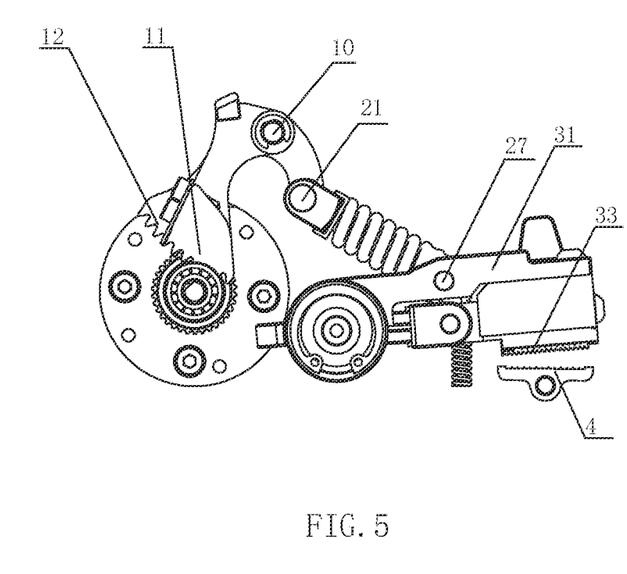
FIG. 5 is a schematic diagram illustrating the mating of main structures of a fusion welding device after reset according to an embodiment of a hand-held baler of the present invention.

After the first input position 11 is subjected to the aforesaid actions, the whole central connection component 1 rotates in the first direction (counterclockwise direction in FIG. 5), thus, the second input position 12 rotates to the position shown in FIG. 5. However, due to the one-way transmission connection relationship between the fusion welding work motor 200 and the transmission mechanism 202. Therefore, although the output component 201 is engaged with the second input position 12, the transmission mechanism does not rotate in the opposite direction. After the locking structure connection position 13 is rotated in the first direction, the axis of rotation between the inclined locking structure and the locking structure connection position 13 also rotates to the outside of the second side of the aforementioned plane, thereby releasing the locking, the mounting frame 31 can be rotated and lifted in a state as shown in FIG. 5. The bonded packing belt can be removed, and the packing belt that needs to be packed and welded can be put in at the same time.

Figure 6:
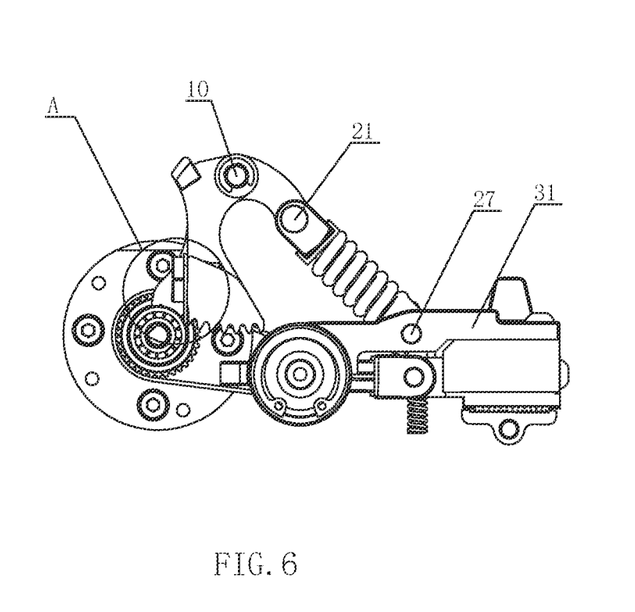
FIG. 6 is a schematic diagram illustrating the mating of main structures of a fusion welding device when the fusion welding work is performing according to an embodiment of a hand-held baler of the present invention.
Figure 7:
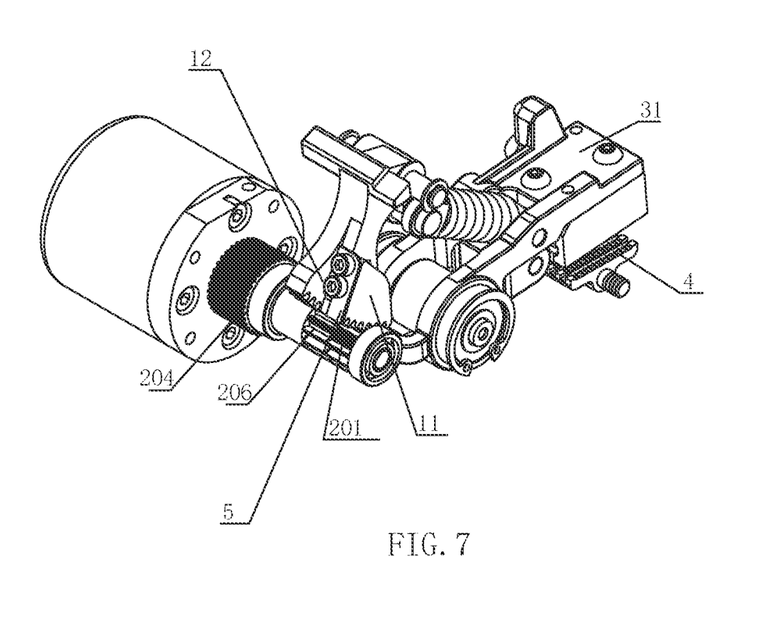
FIG. 7 is a schematic diagram illustrating the main structure of a fusion welding device when a fusion welding work motor is ready to start the fusion welding work according to an embodiment of a hand-held baler of the present invention.
Figure 8:
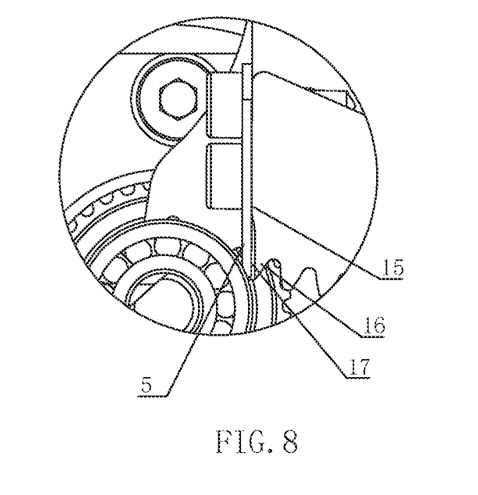
FIG. 8 is an enlarged view of A of FIG. 6.

In the next cycle of packing work, the start switch can be pressed, the packing belt will be tensioned by the tensioning device; when the packing belt is tensioned, the current of the driving motor of the tensioning device will change to make the fusion welding work motor 200 to obtain signals, and the fusion welding work motor 200 automatically starts to rotate forward, so that the output component 201 is driven to rotate, the first input position 11 is driven to rotate in the second direction, and thus the entire central connection component 1 is rotated in the second direction, and the axis of rotation between the inclined locking structure and the locking structure connection position 13 also rotates to the outside the first side of the plane to achieve locking; under the state, the compression spring 22 keeps the central connection component 1 to rotating in the second rotational direction trend, so that the stop block 14 is pressed against the gear 101 of the limiting structure, and under the action of the compression spring 22, the mounting frame 31 is pressed down to an angle for the fusion welding work and enters the fusion welding work state. At this time, the first input position 11 is moved just enough to disengage from the first output component 201 (FIG. 6). At the same time, since the fusion welding work motor 200 and the second input position 12 are in a one-way transmission connection relationship, the second input position 12 only rotates to a corresponding angle with the central connection component 1.

In the state of fusion welding work, the fusion welding work motor 200 drives the fusion welding working component 33 to move back and forth under the guidance of the guide rail 36 by means of the transmission mechanism 202, the eccentric shaft 35, and the fusion welding working power input connection component 34 to perform the fusion welding work. At the same time, since the fusion welding work motor 200 and the second input position 12 are in a one-way transmission connection relationship, the second input position 12 is not driven to rotate and does not interfere with the locked state. At the same time, since the sector gear has been disengaged from the output component 201 (FIG. 6), and the state is maintained by the locking structure, and for the first input position 11, it will not interfere with the locked state. Therefore, the central connection component 1 maintains in normal working state without being interfered.

After the fusion welding work is finished, the reverse rotation work of the fusion welding work motor 200 is started.

With reference to FIGS. 9, 10, 11, and 12, the meanings of the same reference numerals in FIGS. 9-12 are the same as those in FIGS. 1-8, please refer to the description of the above embodiments.

Figure 9:
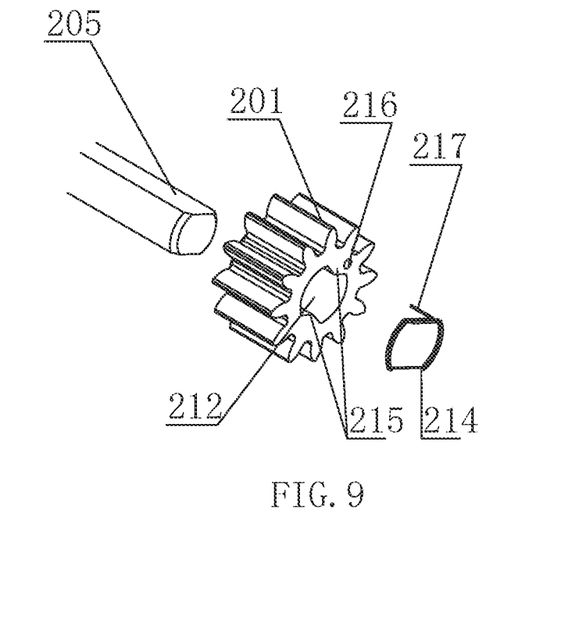
FIG. 9 is an exploded view illustrating the mating of a first input position, a motor shaft and a first output component according to another embodiment of the present invention.
Figure 10:
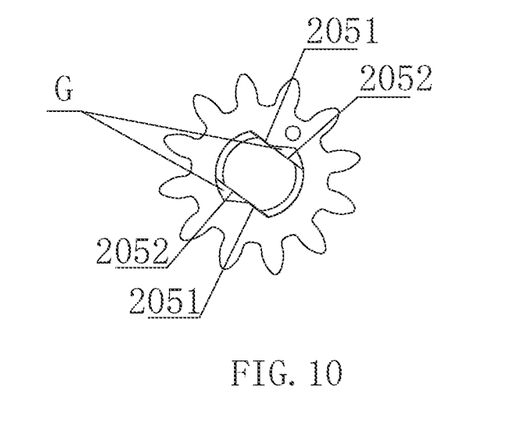
FIG. 10 is a front view illustrating the mating of a first input position, a motor shaft and a first output component according to another embodiment of the present invention.
Figure 11:
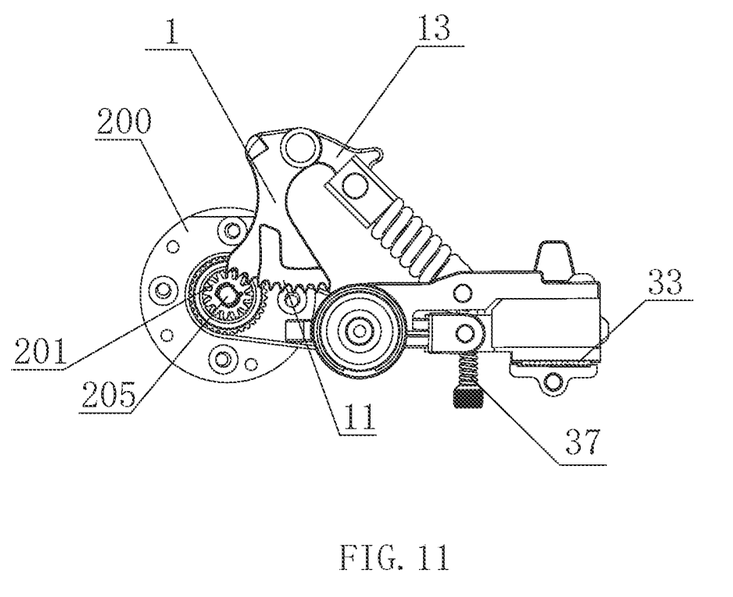
FIG. 11 and FIG. 12 are front views of a partial structure of the present invention when the fusion welding work is performing and is in the reset state for the embodiments shown in FIG. 9 and FIG. 10 respectively.
Figure 12:
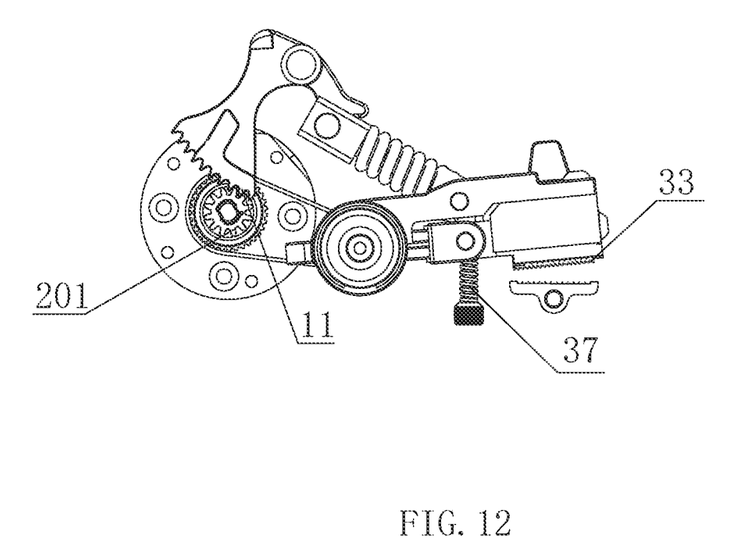

In this embodiment, the clutch connection structure of first input position 11 and first output component 201 includes the following structures:

The motor output gear 201 is provided with a shaft hole 212, the motor output shaft 205 penetrates the shaft hole 212, and a torsion spring 214 is provided between the motor output shaft 205 and the first output component 201 (hereinafter referred to as motor output gear); there is a spacing G in the circumferential direction between the motor output shaft 205 and the motor output gear 201, the motor output shaft 205 is provided with a first driving position 2051 and drives the sector gear of the first input position 11 to rotate in the second direction, the motor output shaft 205 is provided with a second driving position 2052 and drives the sector gear of the first input position 11 to rotate in the first direction after the sector gear 11 is disconnected from the motor output gear 201 and turned into a connected state.

The working direction of the torsion spring 214 is that after the sector gear of the first input position 11 rotates at a certain angle and is disengaged from the motor output gear 201, the motor output gear 201 is driven to continue to rotate when the motor output shaft 205 stops rotating, to cause the motor output gear 201 (protrusion 215 in this embodiment) to disengage the connection with the first driving position 2051, and contact with the second driving position 2052. The central angle corresponding to the spacing G is smaller than the angle between adjacent teeth of the sector gear of the first input position 11.

The part where the motor drive shaft 205 is connected with the motor output gear 201 is a flat shaft, and the planes on both sides are used as the first driving position 2051 and the second driving position 2052. The motor shaft hole 212 of the motor output gear 201 is provided with a protrusion 215, and the two sides of the protrusion 215 are mated with the first driving position 2051 and the second driving position 2052 of the motor output shaft respectively, and can be driven in both directions.

A torsion spring connecting hole 216 is provided on the upper end face of the motor output gear 201, the torsion spring 214 is sleeved on the flat shaft, and one end 217 of the torsion spring 214 is inserted into the torsion spring connecting hole 216 to be connected with the torsion spring connecting hole 216, the torsion spring 216 is provided with a flat spring coil matching the shape of the flat shaft is connected to the flat shaft.

When the sector gear of the first input position 11 is rotated in the reset direction, the motor output gear 201 can have a certain rotation angle relative to the motor output shaft 205 through the spacing G in the circumferential direction and the torsion spring 214, which has a wide range of adaptability and avoids the stuck phenomenon between the sector gear of the first input position 11 and the motor output gear 201, and ensures the automatic connection of the overall work of the hand-held baler.

It should be understood that, in the description of the present invention, the orientation or positional relationship indicated by the terms "one end", "another end", "outside", "inside", "horizontal", "end", "length", "outer end", "left", "right", etc. is based on the orientation or positional relationship shown in the figures, and is only for the convenience of describing the present invention and simplifying the description, rather than indicating or implying that the indicated device or element must have the particular orientation, construction and operation in the particular orientation, therefore, it cannot be construed as limitations of the present invention. The terms "first", "second" are used for brevity of description only, and do not indicate or imply relative importance.

The above description only describes the specific embodiments of the present invention, but the structural features of the present invention are not limited thereto. Any changes or modifications made by those skilled in the art within the field of the present invention shall fall within the scope of protection of the present invention.

The invention claimed is:

1. A fusion welding device, comprising a fusion welding work motor, a fusion welding work moving assembly, and a fusion welding work fixed assembly, the fusion welding work motor being connected with the fusion welding work moving assembly by means of a transmission mechanism;

the fusion welding device is provided with a central connection component that is able to rotate, and the central connection component is provided with a first input component, a second input component, and a locking structure connection component;

the first input component is transmissively connected to a clutch of the fusion welding work motor, and the fusion welding work motor is able to drive, by means of a first output component, the first input component to produce a rotation in a second direction, and thereby drive the central connection component to rotate in the second direction, and after rotating to a set angle, the first input component and the first output component disengage, said set angle corresponding to an angle of rotation required for the fusion welding work moving assembly to move to a fusion welding working location, the second input component, on the basis of driving of the motor, produces a rotation in a first direction, to cause the central connection component to produce rotation in the first direction and cause the first input component to be connected to the first output component.

2. The fusion welding device according to claim 1, wherein the first input component is a sector gear, the first output component is a gear; the second input component is a gear, and on the basis of the driving of the fusion welding work motor, produces a rotation in the first direction.

3. The fusion welding device according to claim 1, wherein the fusion welding device is provided with a fusion welding working state locking structure of the fusion welding work moving assembly, and an upper end of the locking structure is rotatably connected to the locking structure connection component, an axis of rotation is parallel to an axis of rotation of the central connection component, and a lower end of the locking structure is connected with the fusion welding work moving assembly; the fusion welding device is provided with a limiting structure to limit a maximum rotation angle of the central connection component in the second direction; the fusion welding device is configured such that the locking structure is in a locked state when a fusion welding work is performed, and the first input component and the first output component are in a disengaged state, and the central connection component maintains a rotation in a second rotational direction, so that the fusion welding work moving assembly is not lifted up, before the fusion welding work starts, the fusion welding work moving assembly is in a lifted state, the locking structure is in a non-locked state, and the first input component and the first output component are in a connected state.

4. The fusion welding device according to claim 1, wherein the fusion welding working state locking structure comprises an upper assembly and a lower assembly, the upper assembly is rotatably connected with the locking structure connection component, and the lower assembly is rotatably connected with the fusion welding work moving assembly; a compression spring is provided between the upper assembly and the lower assembly, and a length adjusting component is provided for one of the upper assembly and the lower assembly; the fusion welding device is provided with a limiting structure to limit a maximum rotation angle of the central connection component rotating to the second direction;

the locking structure, the fusion welding work moving assembly, and the central connection component are configured such that when a fusion welding work is performing, the locking structure is in a locked state, and the first input component and the first output component are in a disengaged state, and the central connection component remains a rotation in the second rotation direction, the axis of rotation for a rotational connection between the locking structure and the locking structure connection component is outside a first side of the plane; before the fusion welding work starts, the fusion welding work moving assembly is in a lifted state, the locking structure is in a non-locked state, the axis of rotation for the rotational connection between the locking structure and the locking structure connection component is outside a second side of the plane, and the first input component and the first output component are in a connected state; the plane is the plane that passes through the axis of rotation of the central connection component and the axis of rotation for the rotational connection between the fusion welding work moving assembly and the locking structure.

5. The fusion welding device according to claim 1, wherein the fusion welding work moving assembly comprises a mounting frame, the mounting frame is rotatably mounted on a mounting base, and the mounting frame is further connected with the central connection component by means of the fusion welding working state locking structure, the rotation of the central connection component in the second direction causes the fusion welding work moving assembly to rotate to an angle for the fusion welding work by means of the locking structure, and is locked without reverse rotation.

6. The fusion welding device according to claim 5, wherein the fusion welding work moving assembly comprises a fusion welding working component and a fusion welding working power input connection component, and the fusion welding working component and the fusion welding working power input connection component are hinged, the fusion welding working power input connection component is connected with one end of the transmission mechanism by means of an eccentric structure, and the other end of the transmission mechanism is connected with an output end of the fusion welding work motor; the fusion welding working component is slidably connected to a guide rail on the mounting frame; the hinge axis of the fusion welding working component and the fusion welding working power input connection component is parallel to the axis of rotation of the mounting frame.

7. The fusion welding device according to claim 5, wherein the fusion welding work moving assembly comprises a mounting frame top spring arranged between the mounting frame and the mounting base.

8. The fusion welding device according to claim 1, wherein the fusion welding work motor and the transmission mechanism are in a one-way transmission connection relationship, when the central connection component moves in the first direction, the fusion welding work motor and the transmission mechanism are in a drive disengagement connection, and the fusion welding work motor does not drive the transmission mechanism.

9. The fusion welding device according to claim 1, wherein the fusion welding work motor and the second input component are in a one-way transmission connection relationship, and when the central connection component moves in the second direction, the fusion welding work motor and the second input component are in a drive disengagement connection, and the fusion welding work motor does not drive the second input component, and the central connection component is driven to rotate by a motor driving force received by the first input component;

the fusion welding work motor is configured to automatically rotate in a reverse direction after the fusion welding work is completed, and the central connection component generates a reset rotation in the first direction by means of the connection with the second input component.

10. The fusion welding device according to claim 9, wherein the second input component is a gear, and the fusion welding work motor can drive the second input component to rotate in the first direction by means of a second output component;

the first output component, the second output component and a driving wheel of the transmission mechanism are all mounted on the output shaft of the fusion welding work motor, and the second output component and the driving wheel of the transmission mechanism are connected with the output shaft in a one-way drive in the opposite direction, when the fusion welding work motor is rotating forward, the driving wheel of the transmission mechanism can be driven, and when the fusion welding work motor is rotating reversely, the second output component can be driven to rotate.

11. The fusion welding device according to claim 2, wherein a front end of the sector gear of the first input component is provided with an elastic tooth component that mate with the first output component in the first direction.

12. The fusion welding device according to claim 11, wherein the elastic tooth component adopts an elastic sheet and is connected to the front end of the sector gear in the first direction.

13. The fusion welding device according to claim 1, wherein the first input component is a sector gear, and the first output component is a gear.

14. The fusion welding device according to claim 1, wherein the first output component is a gear, the first input component is a sector gear; the first output component is provided with a shaft hole, and a motor output shaft penetrates the shaft hole, a torsion spring is provided between the motor output shaft and the first output component; there is a spacing in a circumferential direction between the motor output shaft and the first output component, the motor output shaft is provided with a first driving component to drive the sector gear of the first input component to rotate in the second direction, the motor output shaft is provided with a second driving component, and drives the sector gear of the first input component to rotate in a first direction after the sector gear is turned from being disconnected from the motor output gear to a connected state;

the working direction of the torsion spring is that after the sector gear of the first input component rotates at a certain angle and is disengaged from the motor output gear, the first output component is driven to continue to rotate when the motor output shaft stops rotating, to cause the first output component to disengage the connection with the first driving component.

15. The fusion welding device according to claim 14, wherein a torsion spring connection hole is provided on an end face of the first output component, the torsion spring is sleeved on the shaft, and one end of the torsion spring is connected with the torsion spring connection hole.

16. The fusion welding device according to claim 14, wherein a part where the motor drive shaft is connected with the first output component is a flat shaft, the motor shaft hole of the first output component is provided with a protrusion, and two sides of the protrusion are respectively mated with the first driving component and the second driving component of the motor output shaft.

17. The fusion welding device according to claim 16, wherein the torsion spring drives the first output component to continue rotation when the motor output shaft stops rotating after the sector gear of the first input component rotates by a certain angle, such that the first output component disengages the connection with the first driving component and rotates to contact with the second driving component.

18. The fusion welding device according to claim 14, wherein a central angle corresponding to the spacing is smaller than the angle between adjacent teeth of the sector gear of the first input component.

19. The fusion welding device according to claim 14, wherein an end face of the first output component is provided with a torsion spring connecting hole, the torsion spring is sleeved on a flat shaft, one end of the torsion spring is connected with the torsion spring connecting hole, and the torsion spring is provided with a flat spring coil matching the shape of the flat shaft, and is connected with the flat shaft.

* * * * *